United States Patent
Nowalis et al.

(10) Patent No.: US 11,710,974 B2
(45) Date of Patent: Jul. 25, 2023

(54) POWER ADAPTER ASSEMBLY AND ELECTRICAL SYSTEM

(71) Applicant: MILWAUKEE ELECTRIC TOOL CORPORATION, Brookfield, WI (US)

(72) Inventors: Dean W. Nowalis, Franklin, WI (US); Gary Lee McMurray, Pewaukee, WI (US); Brian Alves, Milwaukee, WI (US); Timothy R. Obermann, Waukesha, WI (US); Benjamin C. Tesch, Milwaukee, WI (US); DanJun Guo, Dongguan (CN); HuaLiang Lai, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 380 days.

(21) Appl. No.: 16/711,510

(22) Filed: Dec. 12, 2019

(65) Prior Publication Data
US 2020/0194735 A1    Jun. 18, 2020

(30) Foreign Application Priority Data
Dec. 12, 2018   (CN) .......................... 201822087957.0

(51) Int. Cl.
*H02J 7/00* (2006.01)
*H05K 7/14* (2006.01)
*H01M 50/247* (2021.01)

(52) U.S. Cl.
CPC ......... *H02J 7/0063* (2013.01); *H01M 50/247* (2021.01); *H05K 7/1432* (2013.01); *H02J 7/0024* (2013.01)

(58) Field of Classification Search
CPC .... H01M 50/543; H02J 7/0063; H02J 7/0024; H05K 7/1432
(Continued)

(56) References Cited

U.S. PATENT DOCUMENTS 5,355,300 A     10/1994   Zinn
6,104,162 A  *   8/2000   Sainsbury ............. H02J 7/0069
                                                            320/111
(Continued)

FOREIGN PATENT DOCUMENTS

FR       2623345 A1    5/1989
JP    2005-278375 A   10/2005
(Continued)

OTHER PUBLICATIONS

International Search Report and Written Opinion for Application No. PCT/US2019/027800 dated Aug. 9, 2019 (10 pages).
(Continued)

*Primary Examiner* — Michael R. Fin
(74) *Attorney, Agent, or Firm* — Michael Best & Friedrich LLP

(57) ABSTRACT

A power adapter assembly and an electrical system. The power adapter assembly is operable to supply power to an electrical device. The power adapter assembly includes a power box including a housing, an electrical circuit supported by the housing, the electrical circuit being operable to receive as input AC power and to output DC power, an adapter controller operable to control the adapter assembly; and an adapter electrically connected to the power box, the adapter including an adapter engagement portion connectable to a device engagement portion to connect the adapter to the electrical device, DC power being output from the electrical circuit through the adapter to the electrical device to power the load, when the adapter engagement portion is connected to the device engagement portion, a communication interface between the adapter assembly and the electrical device being active even when power is not being output to power the load.

15 Claims, 13 Drawing Sheets

(58) Field of Classification Search
USPC .......................................................... 307/151
See application file for complete search history.

(56) References Cited

U.S. PATENT DOCUMENTS

| | | | |
|---|---|---|---|
| 6,243,276 | B1 | 6/2001 | Neumann |
| 7,015,675 | B1 | 3/2006 | Andre |
| 10,727,731 | B1* | 7/2020 | King ................... H04L 67/1095 |
| 2002/0061678 | A1 | 5/2002 | Archambault |
| 2002/0149345 | A1 | 10/2002 | Takano et al. |
| 2003/0090239 | A1 | 5/2003 | Sakakibara |
| 2004/0070369 | A1 | 4/2004 | Sakakibara |
| 2005/0015995 | A1 | 1/2005 | Melton et al. |
| 2005/0082920 | A1 | 4/2005 | Heigl et al. |
| 2006/0214510 | A1 | 9/2006 | Patel |
| 2009/0108828 | A1* | 4/2009 | Edamula ................... H02J 1/06 |
| | | | 323/318 |
| 2010/0221591 | A1 | 9/2010 | Roßkamp et al. |
| 2014/0053412 | A1* | 2/2014 | Carlucci ............. B26B 19/3846 |
| | | | 30/241 |
| 2015/0137789 | A1* | 5/2015 | Furtner ................... G06F 1/266 |
| | | | 323/318 |
| 2015/0143150 | A1* | 5/2015 | Verdun ..................... G06F 1/26 |
| | | | 713/323 |
| 2017/0063073 | A1 | 3/2017 | Friedman et al. |
| 2018/0278196 | A1* | 9/2018 | White ....................... B25F 5/02 |

FOREIGN PATENT DOCUMENTS

| | | |
|---|---|---|
| JP | 2014082136 A | 5/2014 |
| JP | 2016-018602 A | 2/2016 |
| KR | 20090039965 A | 4/2009 |

OTHER PUBLICATIONS

International Search Report and Written Opinion for Application No. PCT/US2019/065841 dated Apr. 17, 2020 (11 pages).

* cited by examiner

POWER ADAPTER ASSEMBLY AND ELECTRICAL SYSTEM

TECHNICAL FIELD

The invention generally relates to battery-powered electrical devices, such as tools, and, more particularly, to a power adapter for an electrical device.

BACKGROUND

Tools, such as power tools (e.g., drills, drivers, saws, nailers, grinders, etc.), outdoor tools (e.g., trimmers, pole saws, blowers, etc.), etc., and other electrical devices (e.g., motorized devices, non-motorized devices, chargers, etc.) (generally referred to herein as "devices" or a "device") may transfer power (e.g., be powered by, supply power to) with rechargeable battery packs. The battery pack may be detached from a device for charging or for use with other devices. In many cases, battery packs are designed such that the same battery pack may be used with many kinds of devices.

SUMMARY OF THE INVENTION

In one independent aspect, a power adapter assembly may be operable to supply power to an electrical device, such as a power tool, an outdoor tool, other electrical devices, etc., including a device engagement portion. The adapter assembly may generally include a power box including a housing and an electrical circuit supported by the housing, the electrical circuit being operable to receive as input AC power and to output DC power, the electrical circuit being operable to output DC power at a first voltage and at a different, second voltage; and an adapter electrically connected to the power box, the adapter including an adapter engagement portion connectable to the device engagement portion to connect the adapter to the electrical device, DC power being output from the electrical circuit through the adapter to the electrical device.

In some constructions, the second voltage may be higher than the first voltage. The electrical circuit may be operable to output a first voltage of about 15 volts (V) (e.g., for communications between the adapter assembly (an adapter controller) and the electrical device (a device controller)) and a second voltage of about 80 V (e.g., to power a load of the electrical device).

In another independent aspect, a power adapter assembly may be operable to supply power to an electrical device including a load, such as a motor, and a device controller operable to control the electrical device. The adapter assembly may generally include a power box including a housing, an electrical circuit supported by the housing, the electrical circuit being operable to receive as input AC power and to output DC power, and an adapter controller operable to control the adapter assembly; and an adapter electrically connected to the power box, the adapter including an adapter engagement portion connectable to the device engagement portion to connect the adapter to the device, DC power being output from the electrical circuit through the adapter to the electrical device to power the load, when the adapter engagement portion is connected to the device engagement portion, a communication and/or control interface between the adapter assembly and the electrical device being active even when power is not being output to power the load.

The adapter assembly may be operable to output power to power the load in response to communication from the electrical device (e.g., from the device controller). Communication between the adapter assembly and the electrical device may include authentication of the adapter assembly and/or the electrical device.

In yet another independent aspect, a power adapter assembly may generally include an electrical circuit operable to receive as input AC power and to output DC power to an electrical device, the electrical circuit having a resonant circuit topology operable to create electrical resonance (e.g., for extremely high efficiency (up to about 99% efficiency, or with less than about 1% losses) in delivery of power from the adapter assembly to the electrical device).

In a further independent aspect, a power adapter assembly may generally include a power box including a housing and an electrical circuit supported by the housing, the electrical circuit being operable to receive as input AC power and to output DC power to an electrical device, the housing defining a compartment in which components of the electrical circuit are housed, an inlet, an outlet, and an airflow path between the inlet and the outlet and through the compartment, air flow through the airflow path being operable to cool the adapter (e.g., components of the electrical circuit), the airflow path being sealed from the compartment; and an adapter electrically connected to the power box, the adapter including an adapter engagement portion connectable to a device engagement portion to connect the adapter to the electrical device, DC power being output from the electrical circuit through the adapter to the electrical device.

In some constructions, the sealed airflow path may inhibit or prevent ingress of contaminants (e.g., fluid, moisture, dust, etc.) to the electrical circuit. The adapter assembly may include a heat sink assembly defining the airflow path. An inlet member may provide the inlet, and an outlet member may provide the outlet. The heat sink assembly may be sealingly connected between the inlet member and the outlet member to seal the airflow path from the compartment.

The heat sink assembly may include a first heat sink member defining a first portion of the airflow path and a separate second heat sink member defining a second portion of the airflow path. A connection member may be sealingly connected between the first heat sink member and the second heat sink member. The connection member may be operable to support the heat sink assembly in the housing. The adapter assembly may include a fan assembly operable to cause air flow through the airflow path. The fan assembly may be sealingly connected to the heat sink assembly.

In another independent aspect, a power adapter assembly may generally include a power box including a housing, an electrical circuit supported by the housing, the electrical circuit being operable to receive as input AC power and to output DC power to an electrical device, and a ground fault circuit interrupter (GFCI) supported on the housing and electrically connected to the electrical circuit; and an adapter electrically connected to the power box, the adapter including an adapter engagement portion connectable to a device engagement portion to connect the adapter to the electrical device, DC power being output from the electrical circuit through the adapter to the electrical device.

In yet independent aspect, a power adapter assembly may generally include a power box including a housing and an electrical circuit supported by the housing, the electrical circuit being operable to receive as input AC power and to output DC power to an electrical device; and an adapter electrically connected to the power box, the adapter including an adapter engagement portion connectable to a device engagement portion to connect the adapter to the electrical device, DC power being output from the electrical circuit through the adapter to the electrical device, the adapter assembly being operable to provide up to about 1535 Watts (W) continuously (e.g., about 19 amps (A) at about 80 V and about 1 A at about 15 V) and up to about 2175 W peak (e.g., about 27 A at about 80 V and about 1 A at about 15 V) for a period of time (e.g., about 3 seconds (s)).

During peak output, after the period of time, the output may be reduced (e.g., the voltage may be reduced to about 70 V, the output may be reduced to about the continuous output level (e.g., to about 1535 W), etc.). The output may be reduced in steps from the peak output level to the reduced output level. Each step may be for a period of time (e.g., about 3 s). If the output is above an output level (e.g., the continuous output level) for a period of time (e.g., about 30 s), the power output may stop (e.g., the output voltage drops to 0 V). Communication between the adapter and the electrical device may, for example, provide an activation signal for output to power the load (e.g., about 80 V), a warning signal (e.g., a shutdown warning from the adapter), etc.

Other independent aspects of the invention may become apparent by consideration of the detailed description and accompanying drawings.

DETAILED DESCRIPTION

Figure 1A:
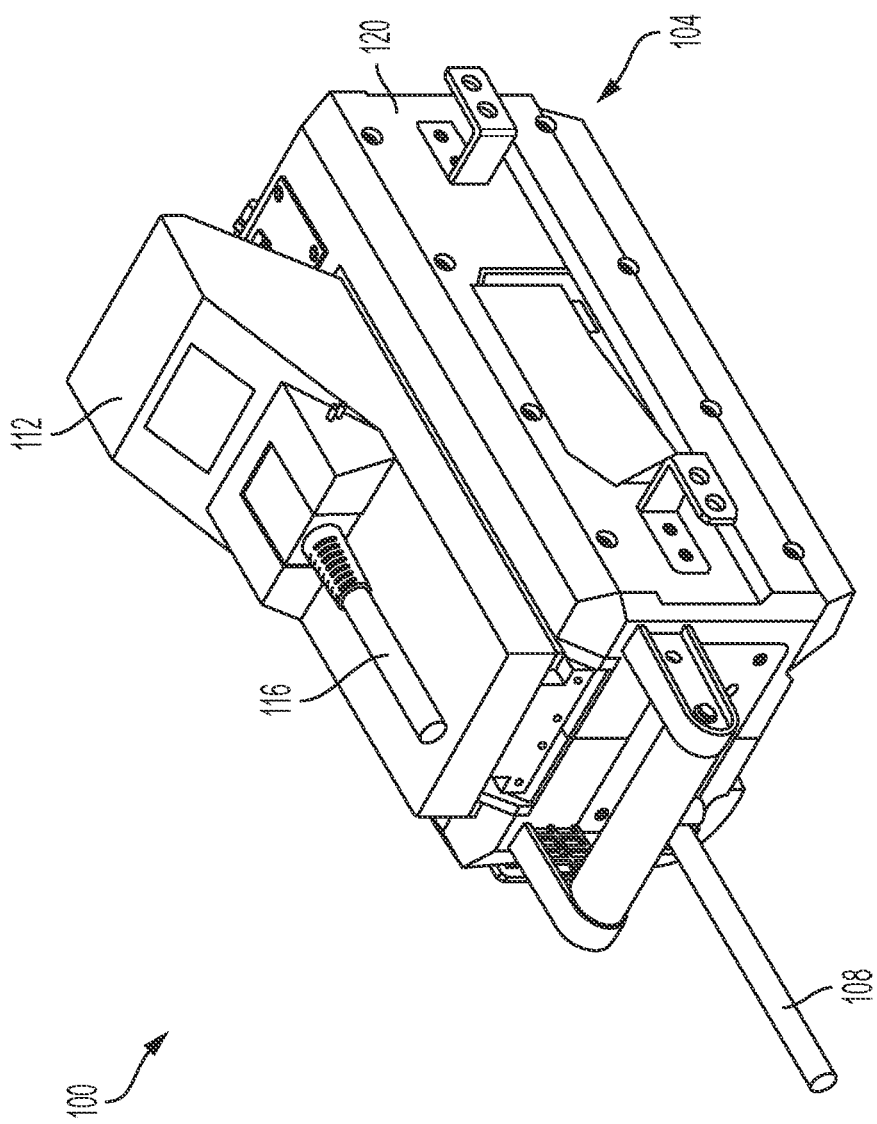
FIGS. 1A-1G are views of a power adapter assembly for use in a system with an electrical device, such as a power tool, an outdoor tool, other electrical device, etc.
Figure 1B:
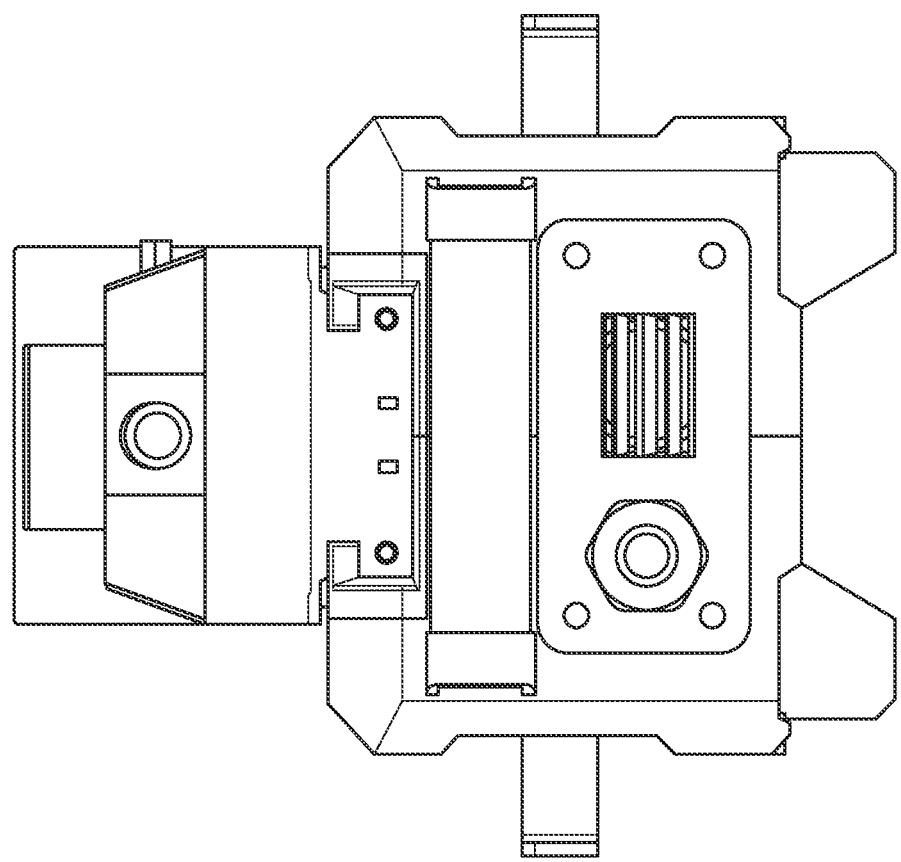
Figure 1C:
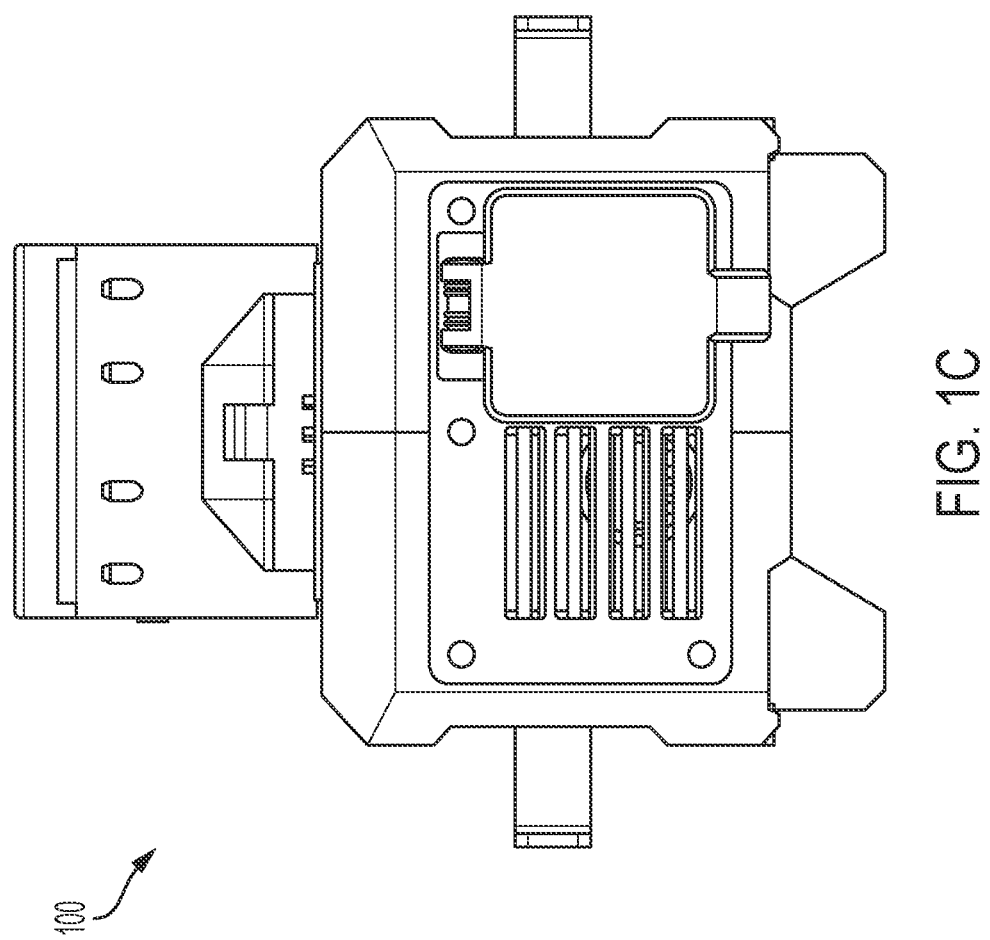
Figure 1D:
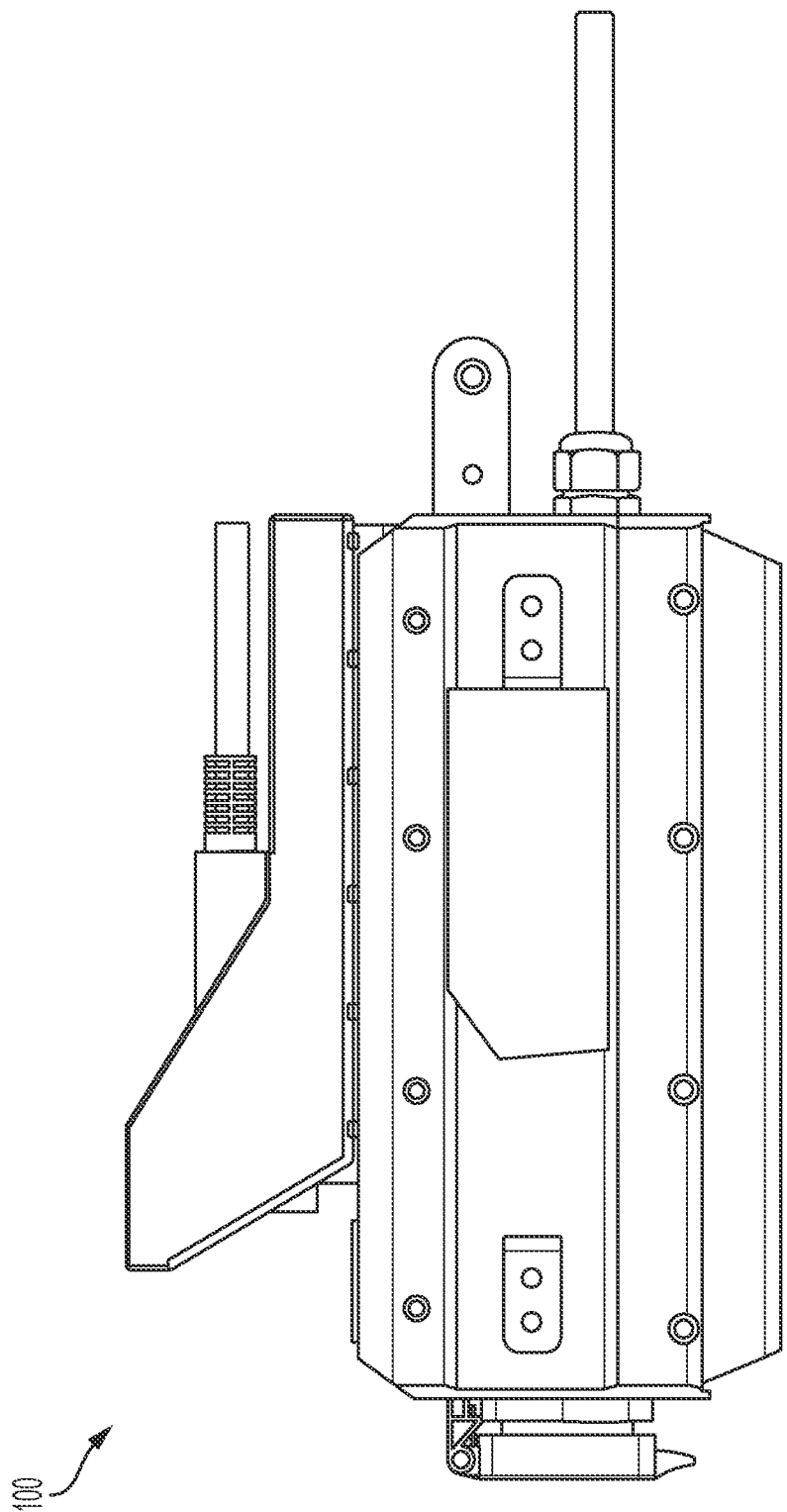
Figure 1E:
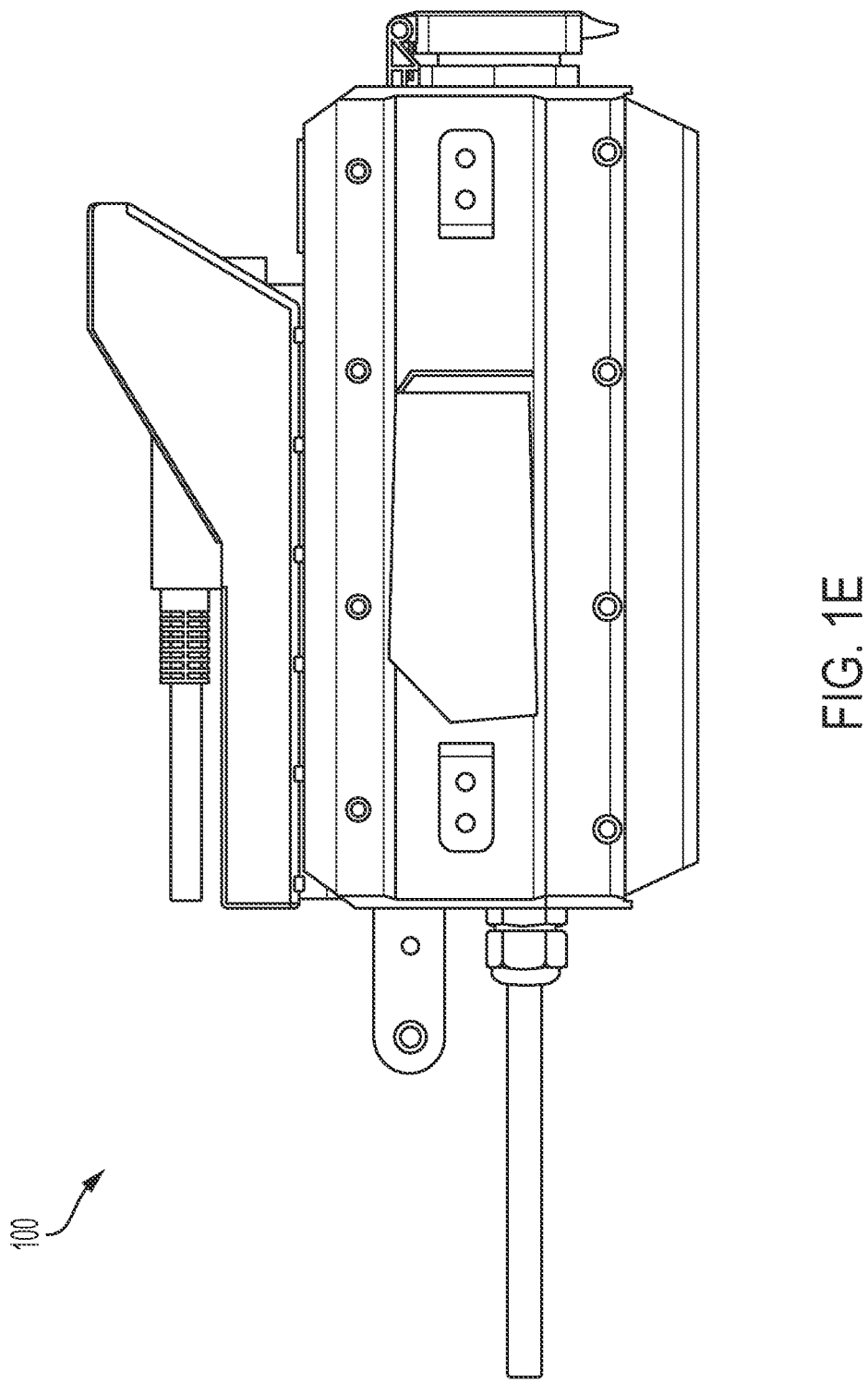
Figure 1F:
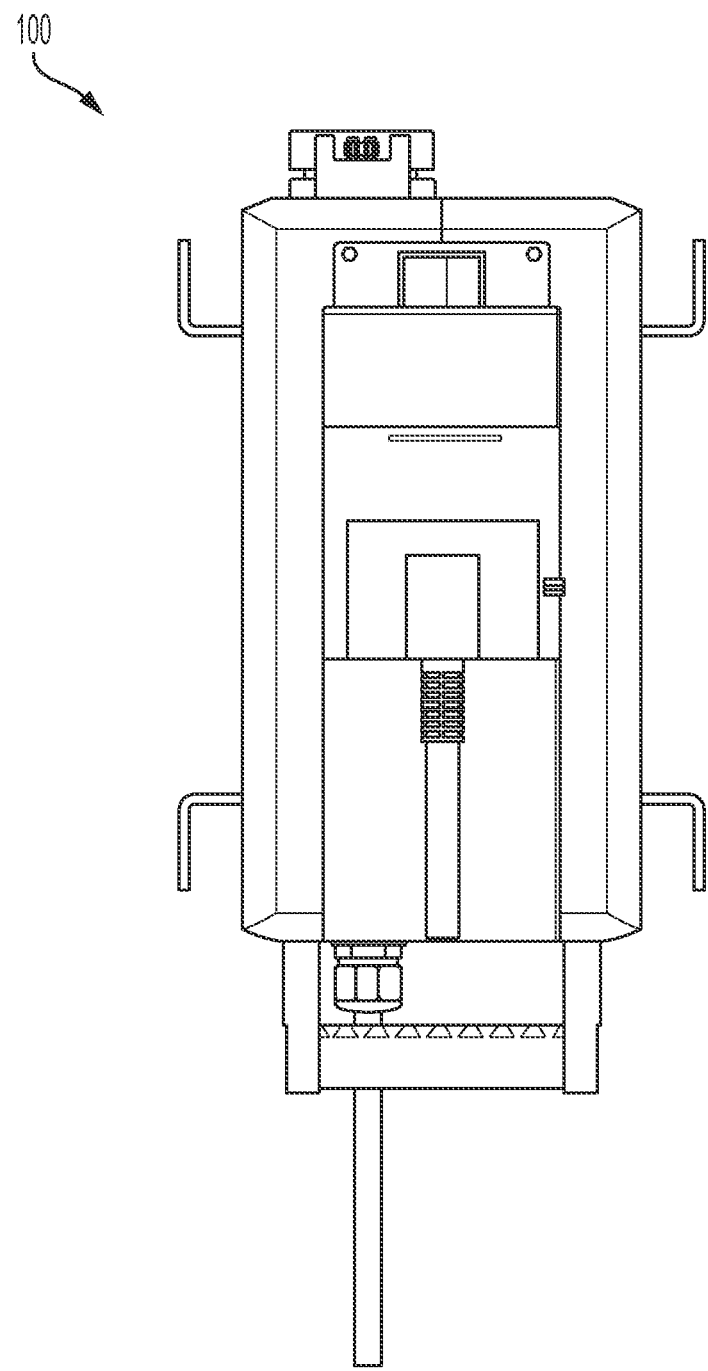
Figure 1G:
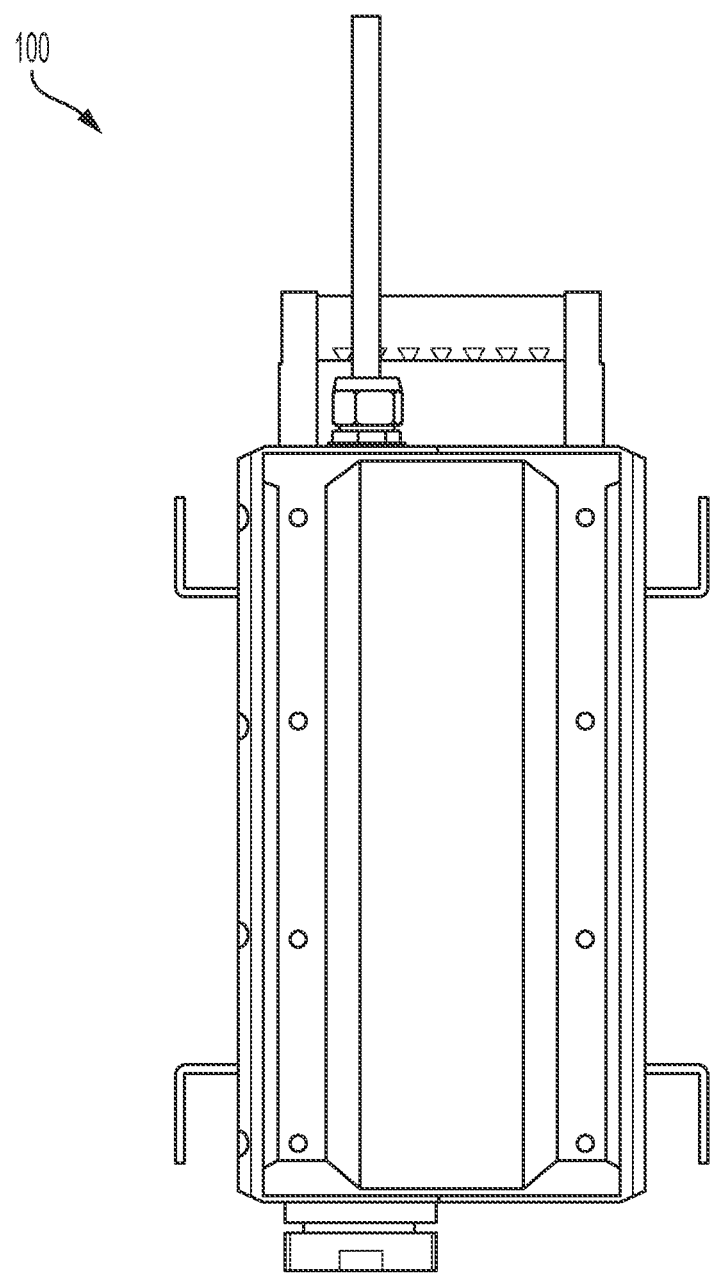

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect relationships (e.g., mountings, connections, supports, couplings, etc.). Further, "connected" and "coupled" are not restricted to physical or mechanical connections or couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 2:
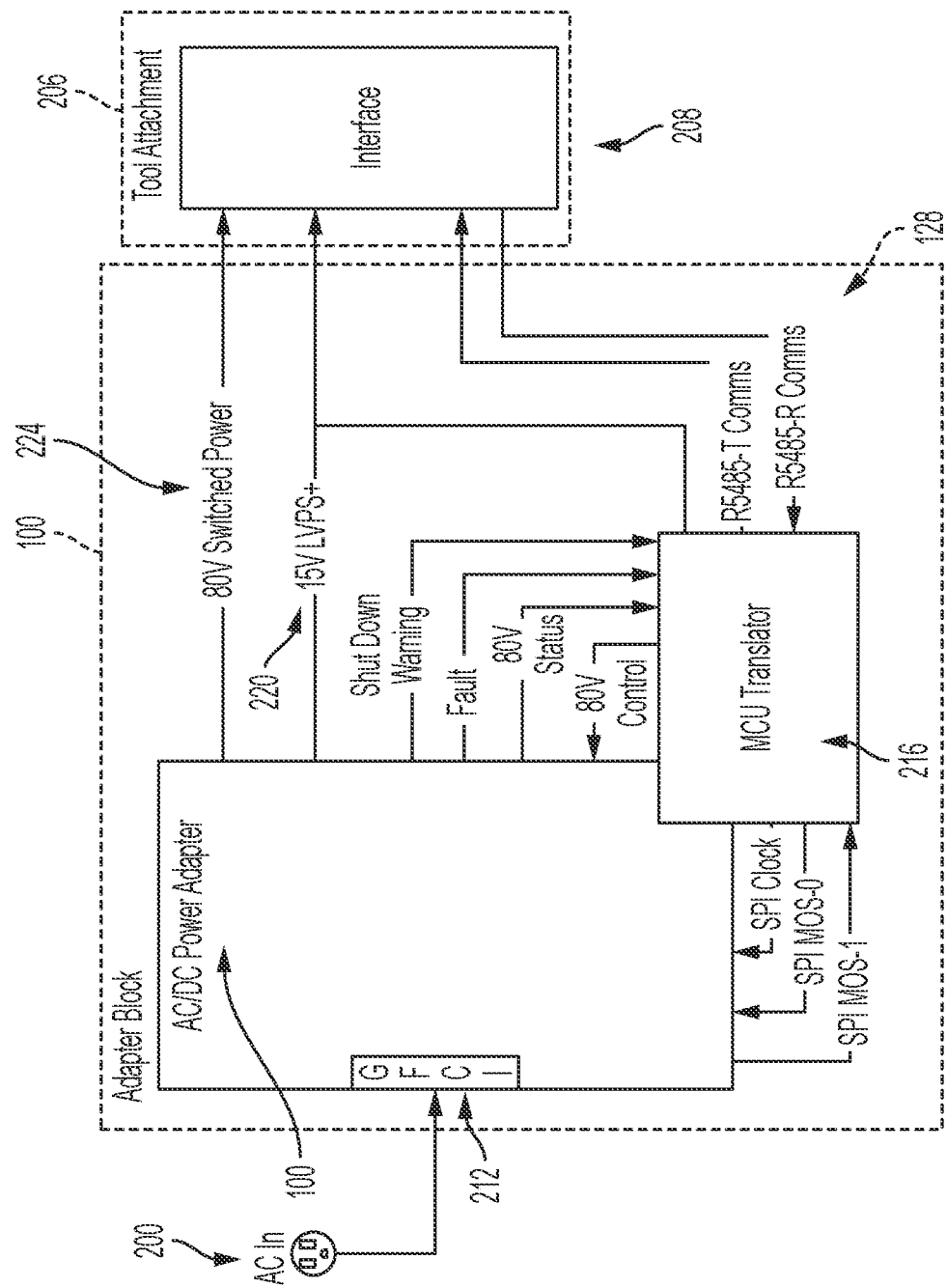
FIG. 2 is a block diagram of the power adapter assembly and an interface for the electrical device.

FIGS. 1A-1G illustrate a power adapter assembly 100 for use with an electrical device 206 (partially schematically illustrated in FIG. 2; e.g., a power tool (e.g., a drill, a driver, a saw, a nailer, a grinder, etc.), an outdoor tool (e.g., a trimmer, a pole saw, etc.), etc., another electrical device (e.g., a motorized device, a non-motorized device, etc.), etc. The electrical device 206 may be selectively powered by a removable and rechargeable battery pack (not shown) or the adapter assembly 100.

The illustrated power adapter assembly 100 includes an AC/DC adapter assembly to connect to and power an electrical device 206. The adapter assembly 100 includes a power box 104 operable to receive as input alternating current (AC) power via a power cord 108 and supply direct current (DC) power via an adapter 112 to the electrical device 206. An adapter cord 116 electrically connects the adapter 112 to the power box 104, and, when not in use, the adapter 112 and the cord 116 may be stored on the power box 104. In other constructions (not shown), the adapter assembly 100 may receive power from another power source (e.g., a DC power source (a battery pack), a generator, etc.).

The power box 104 includes a housing 120 defining a compartment 124 (see FIGS. 6A-6B) housing components (e.g., electrical circuitry) of the power box 104. The power box 104 includes an electrical circuit 128 (see FIG. 2) operable to power the device 206 by converting a received AC power from an AC power source 200 (e.g., line power) into DC power to be output to the device 206.

As illustrated, AC input is provided through the power cord 108, and the adapter assembly 100 electrically and mechanically couples to the device 206 (e.g., through the adapter 112) to provide DC power to the device 206. The adapter assembly 100 replaces the battery pack as a power source for the device 206, and, therefore, at least the adapter 112 is complementary in shape, size, etc., to the battery pack in order to couple to and power the device 206. The adapter assembly 100 is locked out (e.g., mechanically and/or electrically) from being coupled to a battery charger in case a user attempts to couple the adapter 112, with its complementary interface, rather than a battery pack to the battery charger.

FIG. 2 illustrates a block diagram of the adapter assembly 100 and the attachment interface 208 of the electrical device 206. As shown in FIG. 2, AC power from the power source 200 is input to the adapter assembly 100 through a ground fault circuit interrupter (GFCI) 212 supported on the housing 120 and incorporated into the adapter assembly 100. The GFCI 212 prevents overcharge current from entering the adapter assembly 100 or the attachment interface 208 of the connected electrical device 206.

The adapter assembly 100 communicates with the electrical device 206 through a microcontroller unit (MCU) translator 216. Communicated data may include, but is not limited to, authentication (e.g., the "battery pack" authentication for operation with the electrical device), control signals, output voltage information (e.g., high voltage output for operation, low voltage output for communication and control), status information, fault information, warnings (e.g., a shutdown warning), etc.

The MCU translator 216 communicates through, in the illustrated construction, a full duplex interface with the electrical device 206. The MCU translator 216 sends data, signals, etc. to the electrical device 206 through a RS485-T communication line. Data, signals, etc. are received by the MCU translator 216 from the attachment interface 208 and the electrical device 206 through the RS485-R communication line.

The adapter assembly 100 is operable to output DC power at a low voltage (a low-voltage power supply; e.g., about 15 V) for communication and control between controllers in the adapter assembly 100 and the electrical device 206 (a.k.a., the communication and control voltage). The communication and control voltage is sufficient to power certain functions of the electrical device 206 (e.g., the controller of the electrical device 206, indicators, a communication module, etc.). The low voltage is output through a low voltage line 220.

The adapter assembly 100 is also operable to output DC power at a high voltage (e.g., about 80 V) to power a load (e.g., a motor) of the electrical device 206 (a.k.a., an operating voltage). The operating voltage to power the device 206 is output through a high output voltage line 224 from the adapter assembly 100 to the attachment interface 208.

When the adapter 112 is connected to the device interface 208, the communication and/or control interface between the adapter assembly 100 and the electrical device 206 is active even when operating power is not being output to the electrical device 206 to power the load. In the illustrated construction, the adapter assembly 100 is operable to output the operating power to power the load in response to communication from the electrical device 206 (e.g., from the device controller).

The power and communication and control interface between the adapter assembly 100 and the electrical device 206 may be similar to that between the complementary battery pack and the electrical device 206. A similar interface a battery pack and an electrical device is described and illustrated in U.S. Pat. No. 11,251,508, filed Mar. 23, 2018, the entire contents of which is hereby incorporated by reference.

Figure 3:
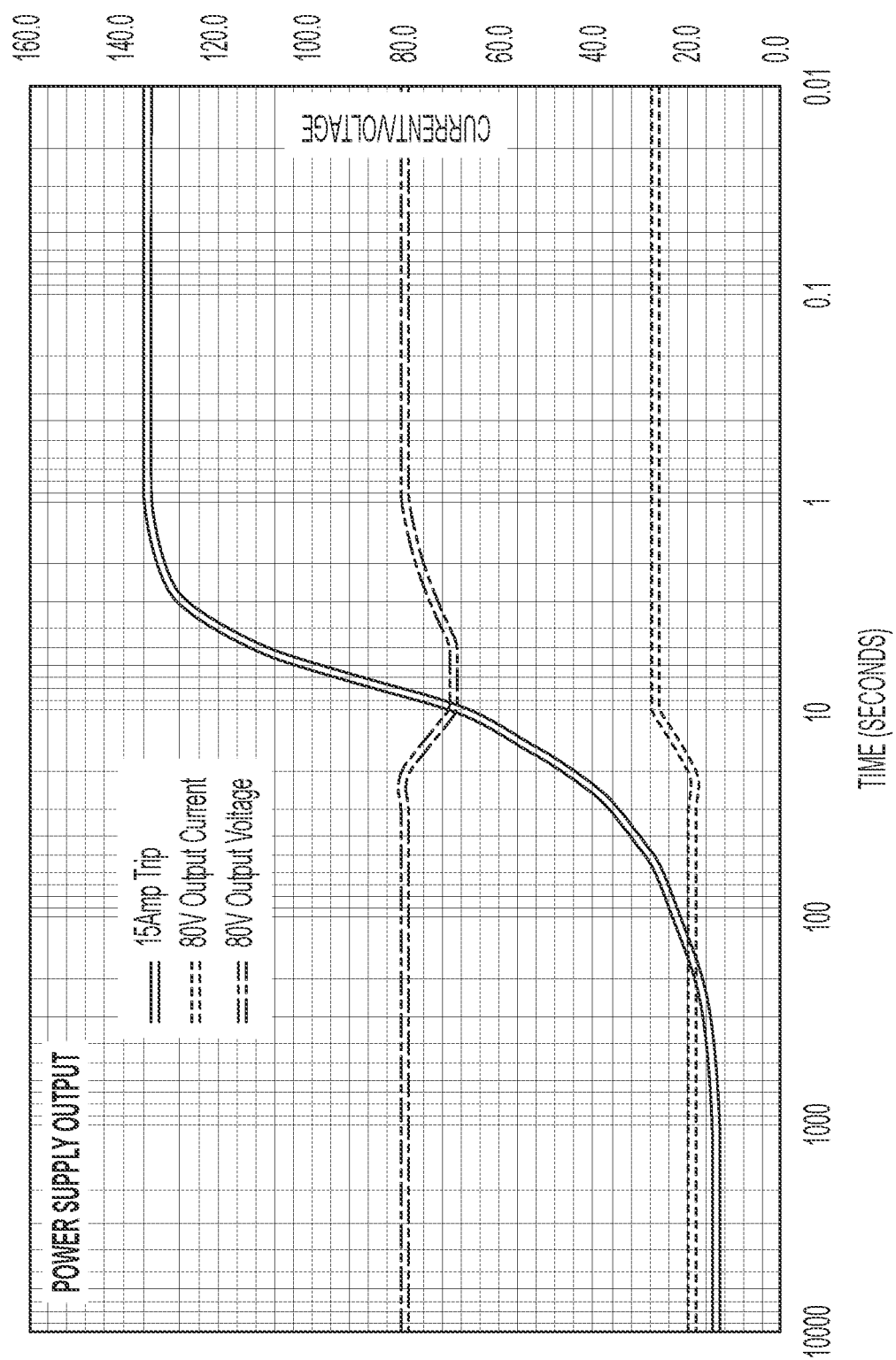
FIG. 3 is a graph of the power supply output over time.

FIG. 3 illustrates a graph of the power supply output by the adapter assembly 100. In the illustrated construction, the adapter assembly 100 is operable to provide up to about 1535 W continuously (e.g., about 19 A at about 80 V and about 1 A at about 15 V) in a non-overload condition. The adapter assembly 100 is operable to output up to about 2175 W peak (e.g., about 27 A at about 80 V and about 1 A at about 15 V) for a period of time (e.g., about 3 seconds (s)).

During peak output, after the period of time, the output of the adapter assembly 100 may be reduced (e.g., the voltage may be reduced to about 70 V, the output may be reduced to about the continuous output level (e.g., to about 1535 W), etc.). The output may be reduced in steps from the peak output level to the reduced output level. Each step may be for a period of time (e.g., about 3 s). If the output is above an output level (e.g., the continuous output level) for a period of time (e.g., about 30 s), the power output may stop (e.g., the output voltage drops to 0 V).

As shown in FIG. 3, in the case of an overload, in the first step (e.g., between about 0-3 s), the output power is about 2175 W (e.g., about 80 V). In the next step (e.g., between about 3-6 s), the output power is reduced to about 2067 W (e.g., about 76 V) and, in the next step (e.g., between about 6-9 s), to about 1986 W (e.g., about 73 V). Through the remaining period of time (e.g., between about 9-30 s), the output power is reduced to about 1905 W (e.g., 70 V). After the time period (e.g., after about 30 s), the power output is stopped (e.g., the output power is less than about 1 W). Prior to shutdown, if the power output is reduced to or below the continuous operating level (e.g., the current draw is reduced to about 19 A or less), the high output voltage (e.g., 80 V) will be restored.

Figure 4:
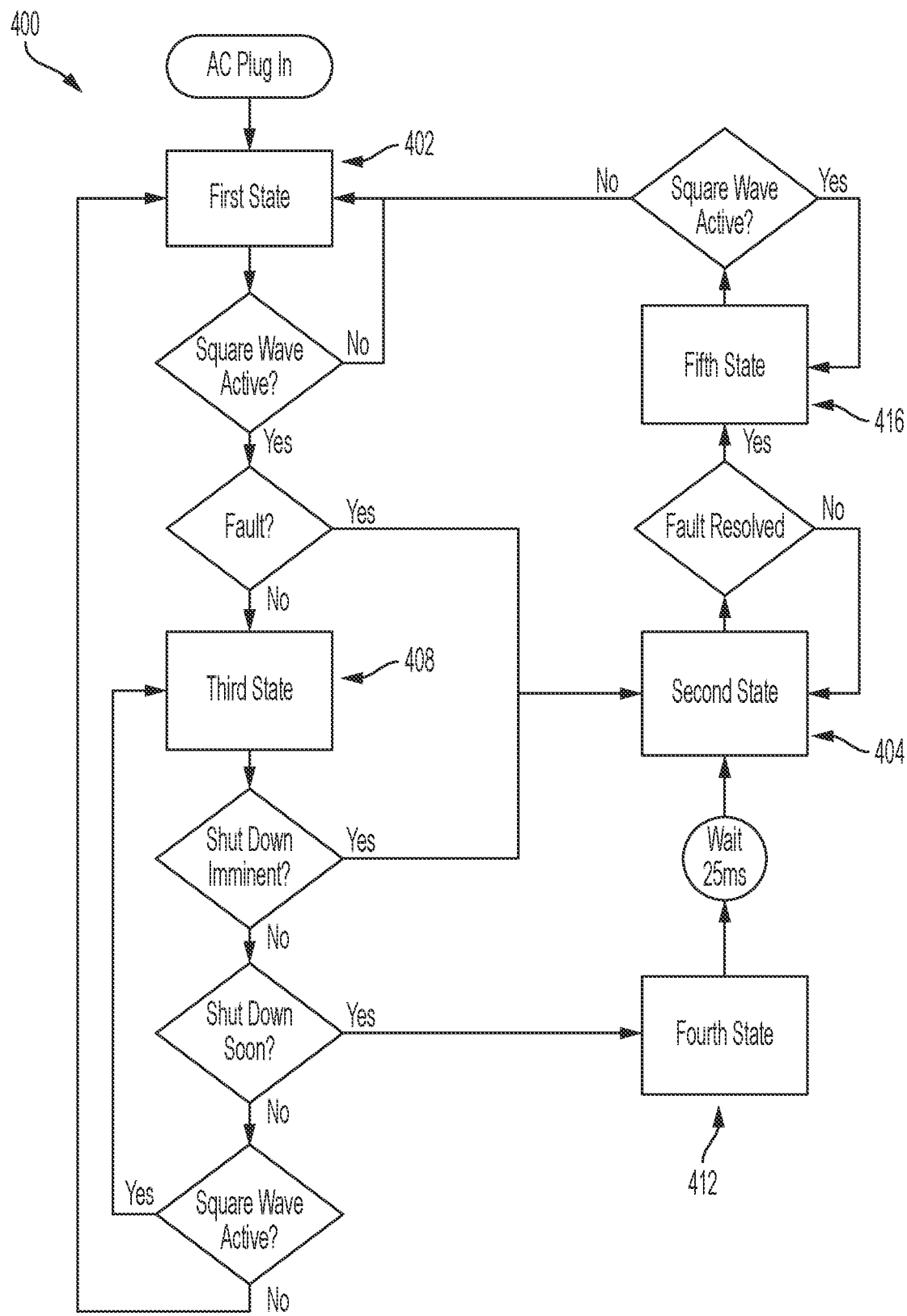
FIG. 4 is a communications flowchart for the operation of the power adapter block.

FIG. 4 illustrates a communication flowchart for operation 400 of the adapter assembly 100. Operation 400 begins when the AC power source 200 is plugged in. The applied AC power results in a first state 402 in which operating power (e.g., 80 V) is not yet being applied by the adapter block 204, and the status, shutdown, and fault communications signals remain at 0 V.

First, the adapter block 204 checks if a square wave with a frequency of around 1 kHz is active. If not, the adapter block 204 remains in the first state 402. If, however, the square wave is active, the adapter block 204 proceeds to check if it is ok to turn on the operating power (e.g., the 80 V high output power). In the illustrated embodiment, this step checks for temperature, AC line voltage, and controller status among other internal checks. If any of the internal checks determine that it is not ok to turn on the high output voltage, the adapter block 204 turns to a second state 404 of the fault checker consisting of the high output remaining in an OFF state, and the fault condition remaining at about 3.3 V, while the shutdown and status states remain at 0 V.

However, if it is found that operating power (80 V) is ok to turn on, then the high output line 224 receives the high output voltage resulting in a third state 408. The third state 408 consists of an applied 80 V with a 1 kHz square wave, while shutdown and fault statuses remain at 0 V. The third state 408 is a normal operation of the adapter block 204 meaning the adapter block 204 remains in this state and provides power as long as the high output does not need to shut down (e.g., due to a fault), and the 1 kHz square wave remains active. If the 1 kHz square wave is determined to no longer be active, then the high output voltage is turned off, and the adapter block 204 returns to the first state 402 where the high output is off, and the status, shutdown, and fault indicators are reset to 0 V.

After this high output is applied and the adapter block 204 is in the third state 408, a fault handler system checks to see if the high output must shut down (e.g., due to a fault). If there is a fault and the high output can stay on for a short period (e.g. about 25 milliseconds (ms) or longer), then a shutdown signal is sent for at least 25 ms before turning off the high output voltage. This is the fourth state 412, in which the high output voltage is on, the 1 kHz square wave is active, the fault indicator is constant at 3.3 V, and a shutdown square wave signal of around 20 kHz is being sent to the electrical device 206. In this way, the MCU translator 216 will warn the electrical device 206 about the shutdown. However, if the high output voltage must shut down immediately (e.g., in the case of a serious fault), the shutdown signal is not sent, and the high output voltage is simply shut off.

In either case for shutdown, after the high output is off, the aforementioned second state 404 of the fault checker, consisting of the high output remaining in an OFF state, the fault condition remaining at 3.3 V, and the shutdown and status states remain at 0 V, is reached. While in this state, the adapter block 204 continually checks to see if the fault is resolved, remaining in the same state if the fault is not resolved, but moving to a fifth state 416 if the fault is resolved. If a fault requires the user to unplug the AC power to be resolved, then the fault handler loops this state until AC power is removed, and the MCU translator 216 resets.

In the fifth state 416, the high output voltage remains off, and the status, shutdown, and fault indicators remain at 0 V. During this time, the adapter block 204 waits until the 1 kHz square wave is determined to be inactive, meaning the value remains constant at either 0 V or 3.3 V. Once the square wave is determined to be inactive, the adapter block 204 returns to the first state 400 in which the high output is off, and the status, shutdown, and fault indicators are reset to 0 V.

Figure 5:
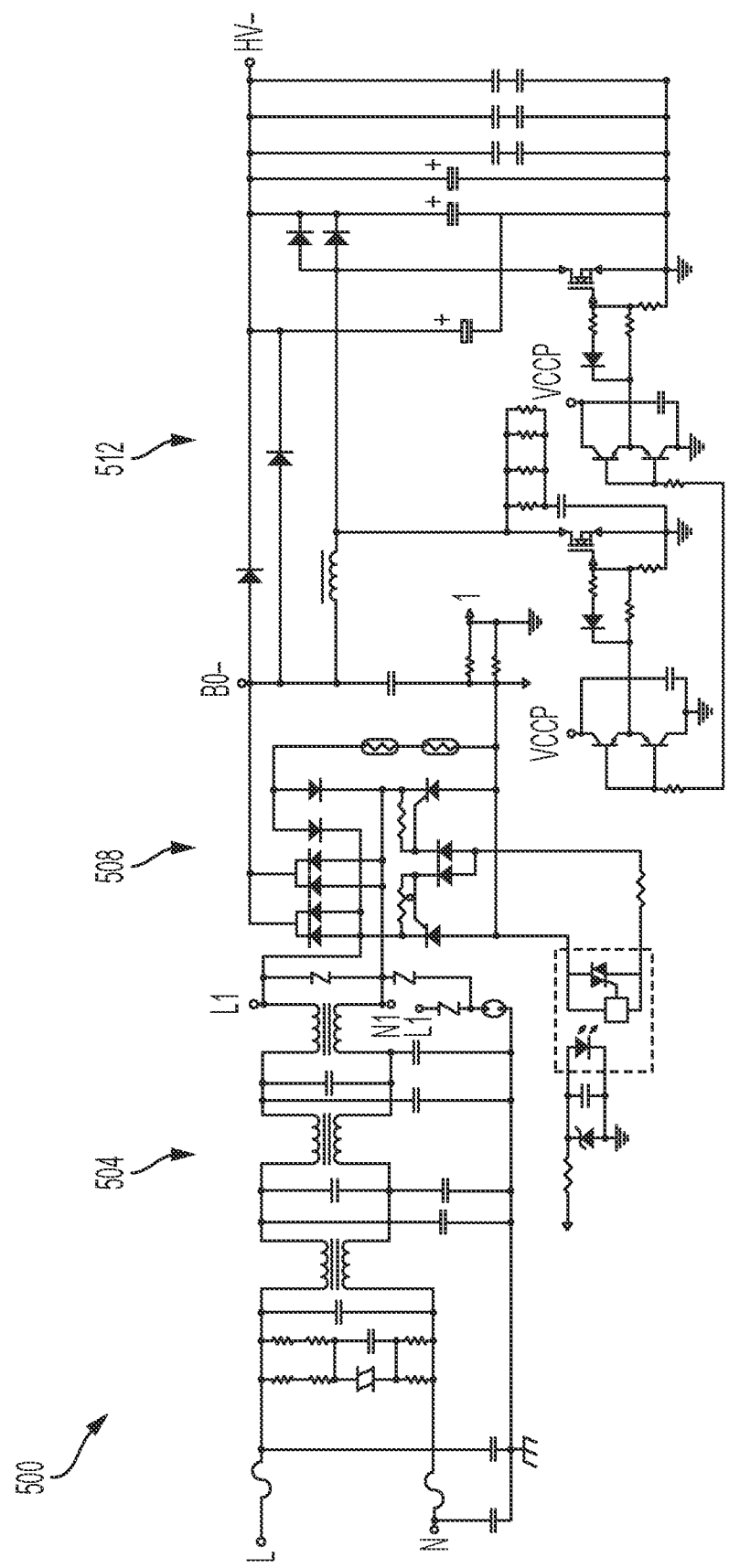
FIG. 5 is a circuit topology for the AC input of the power adapter assembly.

FIG. 5 illustrates a circuit topology of the adapter assembly 100. In the illustrated construction, the adapter assembly 100 uses a circuit topology that allows for electrical resonance. Such a topology allows for extremely high efficiency, for example, up to about 99% efficiency, or less than about 1% losses, in the delivery of power from the adapter assembly 100 to the electrical device 206. The circuit of the adapter assembly 100 allows for this high efficiency by selecting a topology that brings the impedance between the input and the output of the circuit as close to zero as possible.

The illustrated AC input circuitry 500 of the adapter assembly 100 includes an EMI filter 504 to reduce noise from the AC input signal and smooth the electrical current flowing into the adapter assembly 100. Rectifier circuitry 508 converts the smoothed AC input into a DC current to be sent to the electrical device 206, and boost circuitry 512 increases the power of the applied signal to a high output voltage to meet the demands of the connected electrical device 206.

Figure 6A:
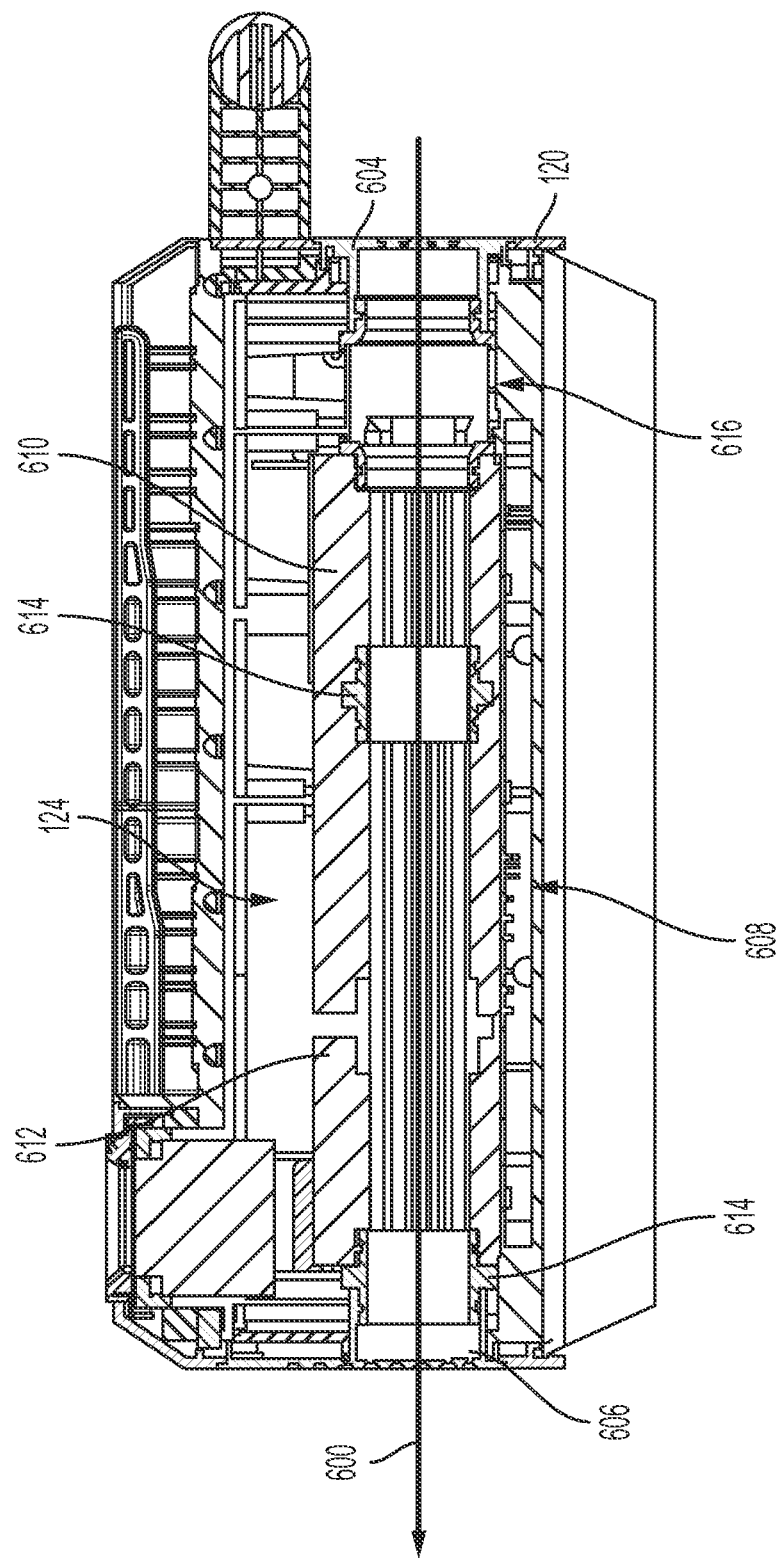
FIG. 6A is a side cross-sectional view of the power adapter assembly of FIGS. 1A-1G illustrating the airflow path.
Figure 6B:
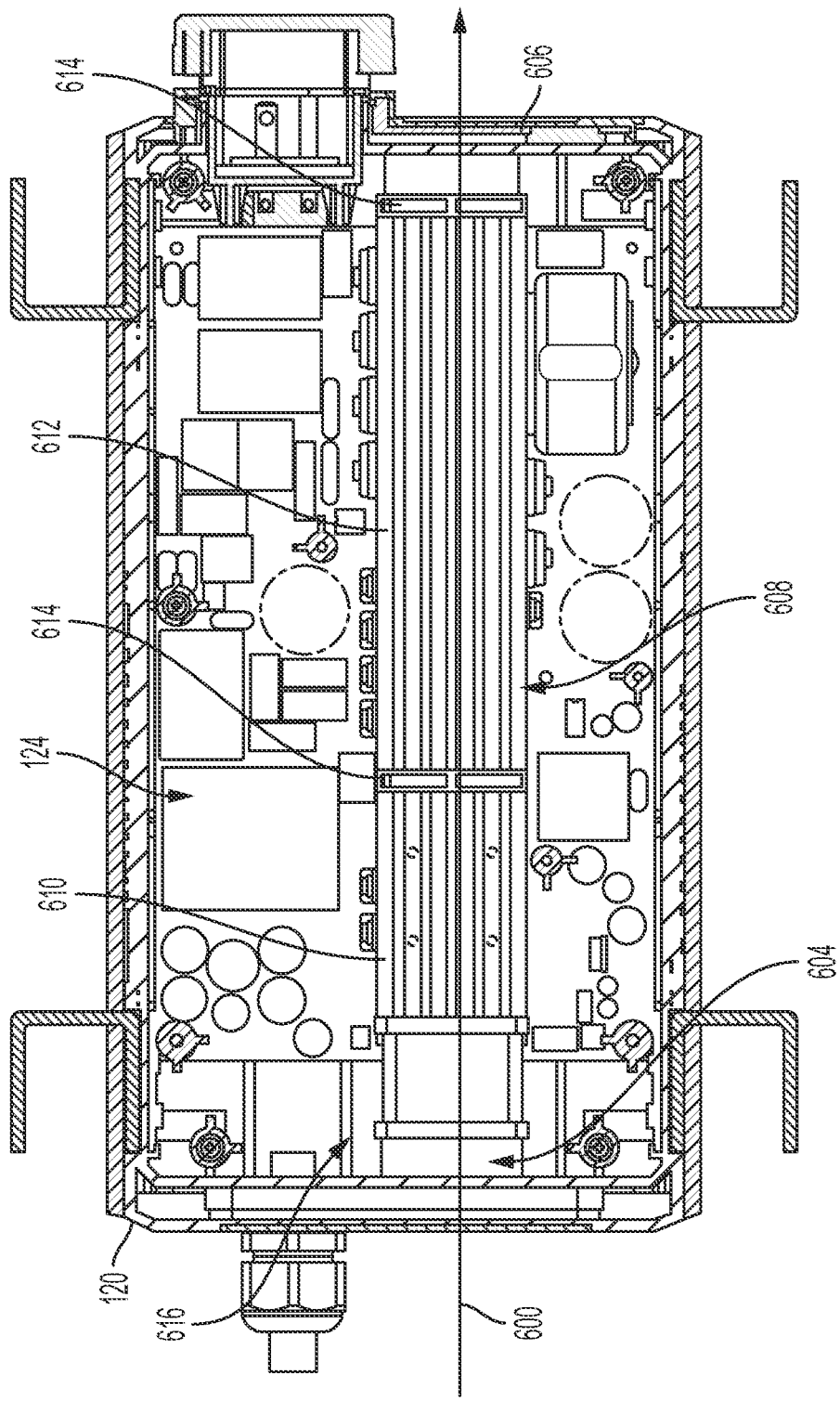
FIG. 6B is a top cross-sectional view of the power adapter assembly of FIGS. 1A-1G, illustrating the airflow path.

As shown in FIGS. 6A-6B, the adapter assembly 100 includes an isolated or sealed airflow path 600 to cool components of the adapter assembly 100 (e.g., heating generating electrical components) while inhibiting or preventing ingress of contaminants (e.g., fluid, moisture, dust, etc.) into the compartment 124. An inlet member 604 defines an inlet of the flow path 600, and an outlet member 606 defines an outlet of the flow path 600.

A heat sink assembly 608 defines a majority of the flow path 600. The heat sink assembly 608 includes a first heat sink member 610 defining a portion of the flow path 600, a second heat sink member 612 defining a second portion of the flow path 600, and one or more connecting members 614. A fan 616 is operable to generate air flow along the flow path 600.

The heat sink members 610, 612 are formed of a thermally-conductive material (e.g., aluminum) and are finned. Heat generated by components in the compartment 124 is drawn through the heat sink members 610, 612 into the flow path 600.

The heat sink assembly 608 is sealingly connected between the inlet and outlet members 604, 606 to seal the airflow path 600 from the compartment 124. The fan 616 is sealingly connected to the inlet member 604, and the first heat sink member 610 is sealed with the fan 616. A connecting member 614 is sealingly connected between the heat sink members 610, 612 and also supports the heat sink assembly 608 in the housing 120. The second heat sink member 612 is sealingly connected to another connecting member 614 and to the outlet member 606.

Thus, in independent embodiments, an AC/DC power adapter assembly 100 may be operable to output multiple voltages to a connected electrical device (e.g., a low voltage communication and control output voltage and a high voltage operating output voltage). The adapter assembly 100 may provide an active communication and control interface even when operating voltage is not being output. The adapter assembly 100 may include a resonant circuit topology. The adapter assembly 100 may have a sealed cooling airflow path for ingress protection. The adapter assembly 100 may have an onboard GFCI. The adapter assembly 100 may provide continuous output of up to about 1535 W and peak output of up to about 2175 W for a short period (e.g., about 3 s).

One or more independent features and/or independent advantages of the invention may be set forth in the claims.

What is claimed is:

1. A power adapter assembly operable to supply power to an electrical tool, the electrical tool including motor, the power adapter assembly comprising:
 a power box including
   a housing,
   an electrical circuit supported by the housing, the electrical circuit being operable to receive as input AC power and to output DC power,
   an adapter electrically connected to the power box, the adapter including an adapter engagement portion connectable to a tool engagement portion to connect the power adapter assembly to the electrical tool, the adapter engagement portion connectable to a storage portion of the housing, DC power being output from the electrical circuit through the adapter to the electrical tool to power the motor, when the adapter engagement portion is connected to the tool engagement portion, a communication interface between the adapter assembly and the electrical tool being active even when power is not being output to power the motor.

2. The power adapter assembly of claim 1, wherein the adapter assembly is operable to output power to the motor in response to a communication from the electrical tool.

3. The power adapter assembly of claim 1, wherein communication between the power adapter assembly and the electrical tool includes authentication of the power adapter assembly or the electrical tool.

4. The power adapter assembly of claim 1, wherein the electrical circuit has a resonant circuit topology operable to create electrical resonance in delivery of power from the power adapter assembly to the electrical tool.

5. The power adapter assembly of claim 1, further comprising a ground fault circuit interrupter supported on the housing and electrically connected to the electrical circuit.

6. The power adapter assembly of claim 1, wherein the electrical circuit is operable to output DC power to the electrical tool at a first voltage and at a different second voltage.

7. The power adapter assembly of claim 1, wherein the adapter engagement portion is electrically or mechanically coupled to the tool engagement portion.

8. An electrical system comprising:
   an electrical tool including a motor and a tool engagement portion; and
   a power adapter assembly operable to supply power to the electrical tool, the power adapter assembly including
      a power box including a housing, an electrical circuit supported by the housing, the electrical circuit being operable to receive as input AC power and to output DC power, and
      an adapter electrically connected to the power box, the adapter including an adapter engagement portion connectable to a tool engagement portion to connect the power adapter assembly to the electrical device, the adapter engagement portion connectable to a storage portion of the housing, DC power being output from the electrical circuit through the adapter to the electrical tool to power the motor, when the adapter engagement portion is connected to the tool engagement portion, a communication interface between the power adapter assembly and the electrical tool being active even when power is not being output to power the-motor.

9. The electrical system of claim 8, wherein the power adapter assembly is operable to output power to the motor in response to a communication from the electrical tool.

10. The electrical system of claim 8, wherein the communication between the power adapter assembly and the electrical tool includes authentication of the power adapter assembly or the electrical tool.

11. The electrical system of claim 8, wherein the electrical circuit has a resonant circuit topology operable to create electrical resonance in delivery of power from the power adapter assembly to the electrical tool.

12. The electrical system of claim 8, wherein the power adapter assembly further includes a ground fault circuit interrupter supported on the housing and electrically connected to the electrical circuit.

13. The electrical system of claim 8, wherein the electrical circuit is operable to output DC power to the electrical tool at a first voltage and at a different second voltage.

14. The electrical system of claim 8, wherein the adapter engagement portion electrically or mechanically connects to the tool engagement portion of the tool.

15. The power adapter assembly of claim 1, wherein the electrical circuit has a resonant circuit topology operable to create electrical resonance in delivery of power from the power adapter assembly to the electrical tool, the resonant circuit topology including an electromagnetic interference filter operable to reduce noise from the AC input and smooth an electrical current flowing into the adapter assembly.

\* \* \* \* \*